United States Patent
Gajji et al.

(10) Patent No.: US 10,088,338 B2
(45) Date of Patent: Oct. 2, 2018

(54) OPTICAL SHAFT TWIST ANGLE MEASUREMENT METHODS AND SYSTEMS

(71) Applicant: HALLIBURTON ENERGY SERVICES, INC., Houston, TX (US)

(72) Inventors: Bhargav Gajji, Houston, TX (US); Ketan Chimanlal Bhaidasna, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 1 day.

(21) Appl. No.: 15/323,950

(22) PCT Filed: Jul. 28, 2014

(86) PCT No.: PCT/US2014/048460
§ 371 (c)(1),
(2) Date: Jan. 4, 2017

(87) PCT Pub. No.: WO2016/018225
PCT Pub. Date: Feb. 4, 2016

(65) Prior Publication Data
US 2017/0199059 A1     Jul. 13, 2017

(51) Int. Cl.
*G01D 5/26* (2006.01)
*G01L 3/08* (2006.01)

(52) U.S. Cl.
CPC ............. *G01D 5/26* (2013.01); *G01L 3/08* (2013.01); *H05K 999/99* (2013.01)

(58) Field of Classification Search
None
See application file for complete search history.

(56) References Cited

U.S. PATENT DOCUMENTS

| | | | | |
|---|---|---|---|---|
| 2,957,338 A | * | 10/1960 | Kennedy | G01N 11/12 73/54.23 |
| 3,663,795 A | * | 5/1972 | Myer | B23K 26/0823 219/121.68 |
| 3,782,826 A | * | 1/1974 | Offutt | G01B 11/26 356/510 |
| 4,250,380 A | * | 2/1981 | Iyeta | G01D 5/30 250/214 PR |

(Continued)

FOREIGN PATENT DOCUMENTS

| | | |
|---|---|---|
| EP | 1111358 | 7/2002 |
| WO | 2011/047397 | 4/2011 |

OTHER PUBLICATIONS

PCT International Search Report and Written Opinion, dated Apr. 21, 2015, Appl No. PCT/US2014/048460, "Optical Shaft Twist Angle Measurement Methods and Systems," Filed Jul. 28, 2014, 15 pgs.

*Primary Examiner* — Shawn Decenzo
*Assistant Examiner* — Jarreas C Underwood
(74) *Attorney, Agent, or Firm* — Polsinelli PC

(57) ABSTRACT

A system includes a shaft and a light path surface coupled to or integrated with the shaft. The light path surface is displaced as a function of twist angle at a point along the shaft. The system also includes a sensor configured to measure the light path length that varies according to displacement of the light path surface. The system also includes a processing unit that determines a twist angle value for the point along the shaft based on the measured light path length.

20 Claims, 9 Drawing Sheets

(56) References Cited

U.S. PATENT DOCUMENTS

| | | | |
|---|---|---|---|
| 4,520,681 A * | 6/1985 | Moore | G01L 3/242 73/862.28 |
| 4,616,503 A * | 10/1986 | Plungis | G01N 11/06 73/54.08 |
| 5,044,084 A * | 9/1991 | Pfeiffer | B62D 15/02 33/1 N |
| 5,389,780 A * | 2/1995 | Anderson | G01L 3/12 250/225 |
| 5,438,882 A * | 8/1995 | Karim-Panahi | G01H 1/10 73/650 |
| 5,503,003 A * | 4/1996 | Brookfield | G01N 11/14 73/54.28 |
| 5,684,596 A * | 11/1997 | Eslinger | G01B 11/16 356/228 |
| 5,734,108 A * | 3/1998 | Walker | G01H 9/00 73/650 |
| 5,918,286 A | 6/1999 | Smith et al. | |
| 5,983,720 A * | 11/1999 | Crabb | G01D 5/285 250/231.13 |
| 6,807,849 B1 * | 10/2004 | Reed | G01N 11/14 73/54.28 |
| 7,385,177 B2 * | 6/2008 | Steinberg | G01C 19/64 250/227.14 |
| 7,513,620 B2 * | 4/2009 | Dai | A61B 3/0091 351/205 |
| 7,631,564 B1 | 12/2009 | Sihler et al. | |
| 7,784,364 B2 | 8/2010 | Matzoll et al. | |
| 8,395,111 B2 * | 3/2013 | Phan Le | G01D 5/285 250/214 R |
| 8,847,145 B2 * | 9/2014 | Masa | G01D 5/38 250/231.13 |
| 9,261,446 B2 * | 2/2016 | Raffer | G01N 11/14 |
| 9,354,088 B2 * | 5/2016 | Shimizu | G01D 5/3473 |
| 2004/0049357 A1 | 3/2004 | Delvaux et al. | |
| 2004/0129868 A1 * | 7/2004 | Kilmartin | G01B 11/16 250/227.14 |
| 2004/0227065 A1 * | 11/2004 | Thorburn | G01D 5/285 250/231.13 |
| 2006/0032319 A1 | 2/2006 | Zielinkski | |
| 2012/0041691 A1 * | 2/2012 | Fericean | G01D 5/202 702/41 |

* cited by examiner

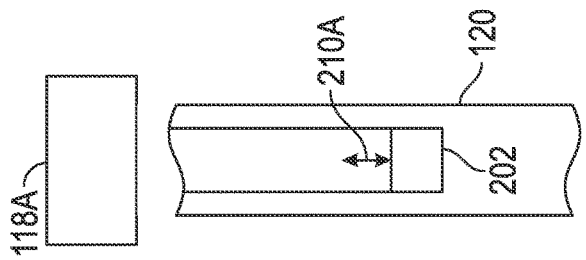
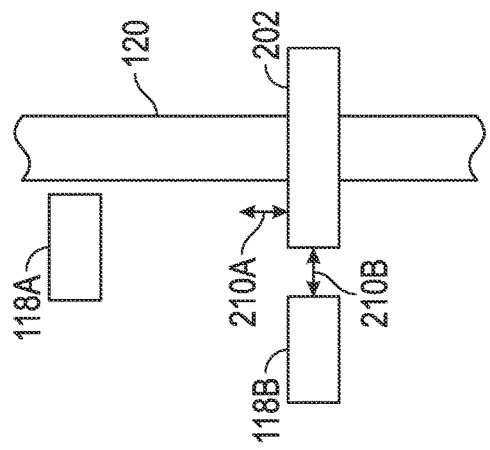
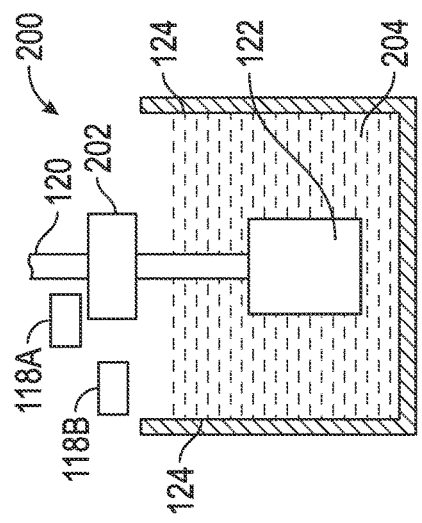
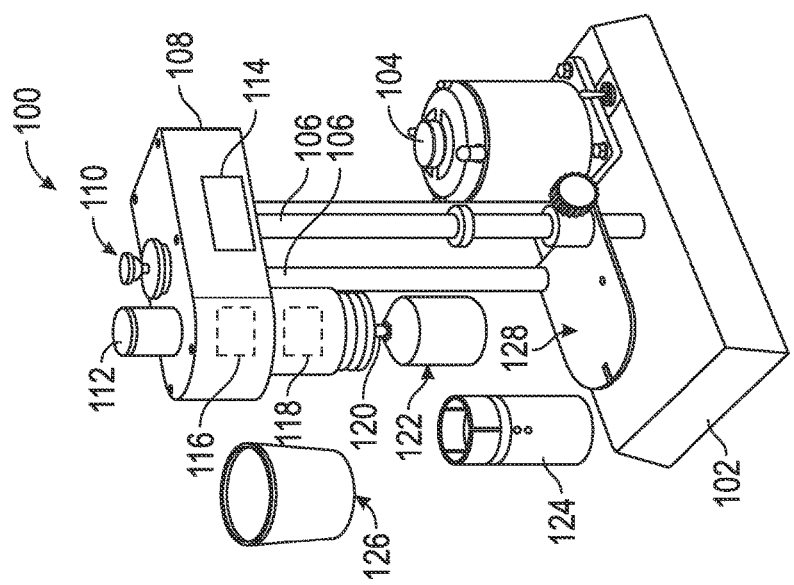

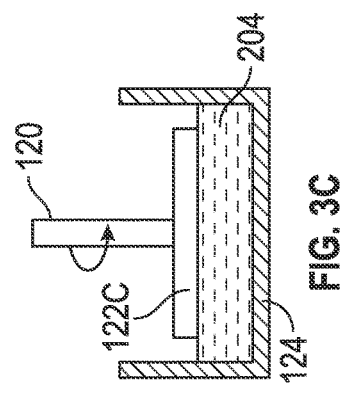
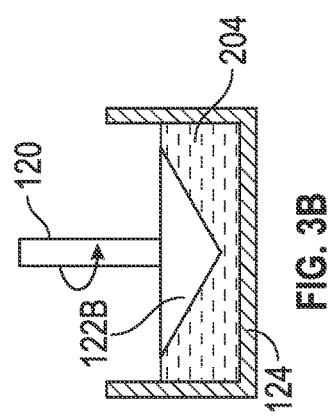
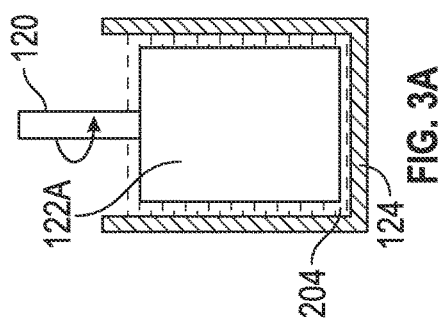
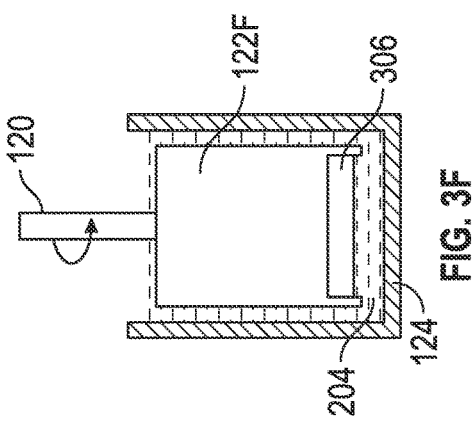
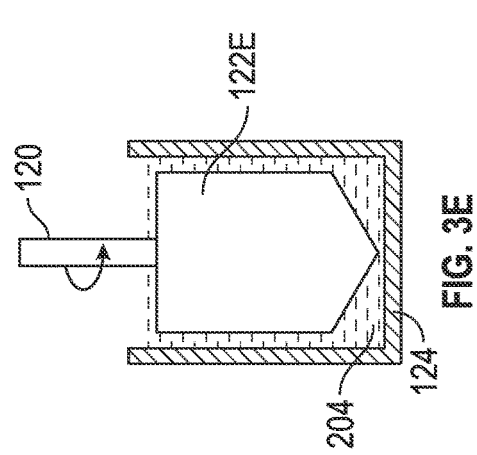
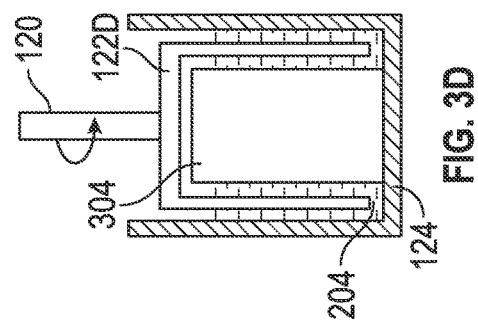

OPTICAL SHAFT TWIST ANGLE MEASUREMENT METHODS AND SYSTEMS

BACKGROUND

Field engineers in oil and gas drilling operations can make costly errors if the viscosity specifications of fluids pumped downhole are incorrect. To reduce such errors, viscosity tests that simulate downhole conditions are often performed at the surface to ascertain the behavior of fluids at different temperatures and pressures before they are pumped downhole.

There are different types of viscosity testing techniques. One example technique involves a rotational rheometer tool that shears a test fluid between two surfaces. The speed at which an object in contact the test fluid rotates in response to a constant torque can be correlated with fluid viscosity. Alternatively, the torque required to rotate an object in contact with the test fluid at a constant speed can be correlated with fluid viscosity.

While the above viscosity testing concepts are straightforward, building a tool that accurately measures torque or rotation speed is problematic. Previous efforts to measure torque include attaching a strain sensor (e.g., a spring) to a shaft, where a bob attached to the shaft is at least partially immersed in the test fluid. In this configuration, the strain sensor tracks the strain applied to the shaft as the test fluid interacts with the bob due to rotation of a housing or "rotor" that encloses the fluid and bob. Unfortunately, strain sensor accuracy often degrades over time. Further, the strain at the top of the shaft where the strain sensor is located is not an accurate reading of the strain at the bottom of the shaft where the bob is located. This is especially problematic if the test involves elevated temperatures or pressures, which require a sealed enclosure (i.e., the seals needed to maintain elevated temperatures or pressures contact the shaft and interfere with strain sensor accuracy).

BRIEF DESCRIPTION OF THE DRAWINGS

Accordingly, there are disclosed in the drawings and the following description optical shaft twist angle measurement methods and systems. In the drawings:

FIG. 1 is a perspective view of a rotational rheometry tool.

FIG. 2A is a cross-sectional view of a rotational rheometry test configuration.

FIG. 2B is a side view of a optical shaft twist angle measurement configuration.

FIG. 2C is a cross-sectional view of another optical shaft twist angle measurement configuration.

FIGS. 3A-3F are cross-sectional view of alternative rotational rheometry test configurations.

Figure 4:
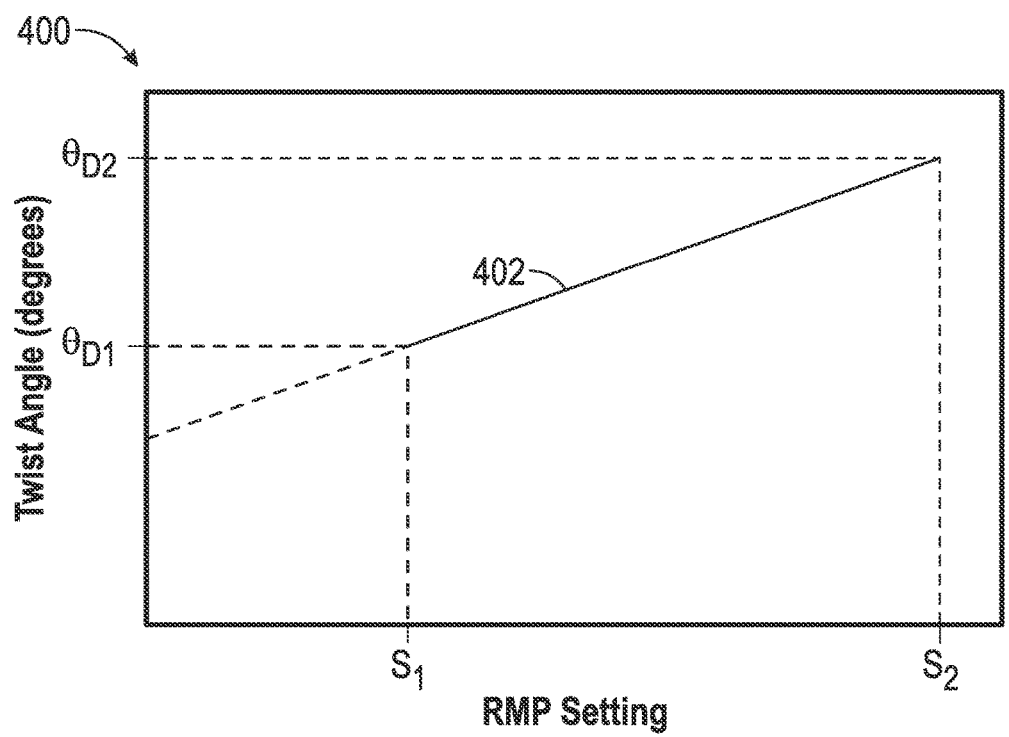
FIG. 4 is a graph that shows an example correlation between a rotation speed and twist angle at a point along a shaft.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various optical shaft twist angle measurement methods and systems. In an example system, a light path surface is coupled to or integrated with a shaft, where the light path surface is displaced as a function of twist angle at a point along the shaft. The system also includes a sensor configured to measure a light path length that varies according to displacement of the light path surface. The system also includes a processing unit that determines a twist angle value for the point along the shaft based on the measured light path length. In an example method, a test that causes twisting of a shaft is performed. As an example, the test being performed may correspond to a rotational rheometry test. Such tests are helpful, for example, to analyze the behavior of fluids before they are pumped downhole. Example fluids for which a rotational rheometry test may be performed include fracturing fluids, drilling muds, cements, and oil/water emulsions. The method also includes varying a light path length as a function of twist angle at a point along the shaft. The method also includes measuring the light path length, and determining a twist angle value for the point along the shaft based on the measured light path length. The method also includes storing or displaying the twist angle value. The twist angle value may be used to derive a torque value at the point along the shaft or other parameters. For example, in a rotational rheometry test scenario, twist angle values and/or torque values may be correlated with fluid viscosity values, fluid gel values, fluid consistency values, and/or other test fluid parameters. The optical shaft twist angle measurement methods and systems are not limited to a rotational rheometry application. Other applications for the disclosed optical shaft twist angle measurement methods and systems include analyzing the behavior of rotating or non-rotating shafts used in machines before or after the machines are assembled.

FIG. 1 shows an illustrative rotational rheometry tool 100. As shown, the tool 100 comprises a base 102 with a motor 104 mounted thereto. Extending from the base 102 are mounting members 106 which supports a test platform 128. A housing 108 is attached to the top end of the mounting members 106 and extends over the test platform 128. The housing 108 encloses various control components of the tool 100 such as a motor speed switch 110 and a manual rotation interface 112. Further, a controller 116 and sensor 118 inside the housing 108 may enable radial or axial displacement of a light path surface to be measured and correlated with a twist angle at a point along shaft 120. Further, the controller 116 may derive other parameters (e.g., a torque value and/or test fluid parameters) from one or more twist angle values. As an example, the controller 116 may correspond to a processing unit and a memory that stores instructions for execution by the processing unit. The instructions enable the processing unit to determine twist angle values from measurements collected by sensor 118. Further, the instructions enable the processing unit to derive torque values from the twist angle values. Further, the instructions enable the processing unit to derive test fluid parameters from the torque values or twist angle values.

In at least some embodiments, the measurements collected by sensor 118 may vary according to displacement of at least one light path surface when twisting of the shaft 120 occurs. The light path surface may be coupled to or integrated with the shaft 120. Further, the light path surface may be external to or internal to the shaft. Some examples of light path surfaces suitable for changing a twist angle measurement into an axial or radial displacement measurement are described in greater detail hereafter. Regardless of the particular light path surface arrangement being used, the sensor 118 measures a light path length between two points, where one of the points corresponds to a surface that is axially or radially displaced as a function of twist angle at a point along the shaft 120. Other possible techniques to measure displacement of a surface or a measurement point along a surface include capacitive sensing and magnetic field sensing. Once the controller 116 has determined shaft twist angle values based at least in part on measurements received from sensor 118, the shaft twist angle values are used to derive torque values and/or test fluid parameters. Shaft twist angle values, torque values, and/or test fluid parameters determined by the controller 116 may be displayed via an electronic display 114, or conveyed to a computer for further analysis or storage via a wired or wireless communication interface.

For the rotational rheometry tool 100, twisting of the shaft 120 occurs during tests in which a bob 122 at one end of the shaft 120 is at least partially immersed in a test fluid. The immersion of bob 122 in test fluid may occur, for example, by adding a test fluid to sleeve 124 (e.g., a rotor) and coupling the sleeve 124 to the tool 100. When coupled to the tool 100, the sleeve 124 is able to spin in one or more directions and at one or more speeds to determine attributes of the test fluid. As the sleeve 124 spins, the test fluid in the sleeve 124 interacts with the bob 122 causing the shaft 120 to twist. The amount of twist (the twist angle) in the shaft 120 resulting from a test can be correlated with fluid properties such as a fluid viscosity value, a fluid gel value, a fluid consistency value, and/or other parameters. Alternatively, the shaft 120 and bob 122 may spin while immersed in a test fluid that is contained within sleeve 124 or fluid container 126. For example, the fluid container 126 may be placed upon the test platform 128 and may be filled with a test fluid that at least partially immerses the bob 122 while the shaft 120 and bob 122 spin. Alternatively, the fluid container 126 may facilitate maintaining or varying the temperature at which tests are performed using the bob 122 and sleeve 124. Although not shown, the rotational rheometry tool 100 may also include an interface for maintaining or varying the pressure at which tests are performed. In such case, twist angle values corresponding to different temperatures or pressures for a test fluid are monitored (the temperatures and pressures may also be stored). The monitored twist angle values corresponding to different temperatures or pressures of a test fluid are stored in the at least one memory unit and are used to calculate a torque value and/or test fluid parameters.

EXAMPLE TESTS

The rheometry tool 100 or similar tools may be configured to perform various tests. While not required, at least some tests performed by the rheometry tool 100 or similar tools comport with the procedures located in API RP-13B-1, Recommended Practice for Field Testing Water-based Drilling Fluids.

In an example test, a viscosity measurement is performed by moving one surface at a given velocity V relative to a second parallel surface. If the distance between the parallel surfaces is d, the fluid in the space between the surfaces is subjected to a shear rate of V/d. This shearing causes the fluid to exert a force F on the surfaces. This force divided by the area of one of the surfaces A is the shear stress F/A. The shear viscosity of the fluid is the ratio of the shear stress to the shear rate:

$$\eta = \frac{F/A}{V/d}. \tag{1}$$

In at least some embodiments, when the rheometry tool 100 performs a viscosity measurement as described above, the test fluid is contained in the annular space between bob 122 and the sleeve 124. Further, the sleeve 124 is rotated at a constant rotational velocity. The rotation of the sleeve 124 around the test fluid produces a torque on the bob 122 and the shaft 120. The twist angle of the shaft 120 is proportional to the viscosity of the test fluid.

In another example test, the rheometry tool 100 measures a gel. In such case, the sleeve 124 may be rotated slowly (e.g., 3 rpm) and the initial gel strength corresponds to the maximum twist angle of the shaft 120 attained after starting the rotation. This is also known as the force at which the gel breaks.

Another variation of the gel test involves rotating the bob 122 throughout a small angle instead of constantly rotating the sleeve 124. In some embodiments, the amount of rotation is that necessary to increase the shear stress at an equivalent rate obtained using a 3 rpm API procedure. The breaking of the gel and the peak shear stress is measured by monitoring the twist angle of the shaft 120 as described herein.

Viscoelastic Measurements:

Oscillatory tests may also be performed by rheometry tool 100 to determine viscoelastic properties of a test fluid. Rather than rotating sleeve 124 at a constant velocity around the bob 122, the oscillatory measurements may be accomplished by turning the sleeve 124 or bob 122 slightly back and forth relative to the other. If the maximum amplitude of one surface's displacement relative to the other is X, the oscillatory shear strain is:

$$\gamma(t) = \frac{X}{d}\cos(\omega t). \tag{2}$$

For small displacements, this oscillatory shear strain produces an oscillatory shear stress:

$$\tau(t) = \frac{F}{A}\cos(\omega t + \delta) \tag{3}$$

where δ is a phase difference between the motion of the sleeve (or bob) and the force felt by the bob.

The complex shear modulus G* is defined with a real portion representing the in-phase relationship between oscillatory strain and stress, and an imaginary portion representing the quadrature-phase relationship:

$$G^* = G' + iG'' = \frac{F/A}{X/d}\cos(\delta) + i\frac{F/A}{X/d}\sin(\delta). \quad (4)$$

For purely elastic materials, the phase difference $\delta=0$, whereas for purely viscous materials, $\delta=90°$. The complex viscosity measurement can be derived from $G^*$:

$$\eta^* = G^*/i\omega \quad (5)$$

with a real part equal to $$\eta = G''/\omega. \quad (6)$$

The complex shear modulus $G^*$ comprises a storage modulus represented by $G'$, and a loss modulus represented by $G''$. $G'$ is related to the elastic behavior of the fluid and $G''$ is related to the viscous behavior of the fluid. A loss factor is represented by $\tan(\delta)$ and is defined as follows:

$$\tan(\delta) = G''/G'. \quad (7)$$

This ratio is useful in determining the sol/gel transition point, or gel point of a fluid. When $\tan(\delta)=1$, the gel point has been reached. If $\tan(\delta)>1$, a liquid state exists, and if $\tan(\delta)<1$, the a gel state exists.

Example rheological properties measured by the rheometry tool 100 or similar tools that employ the disclosed techniques for measuring shaft twist angle include, but are not limited to, complex sheer modulus $G^*$, storage modulus $G'$, a loss modulus $G''$, complex viscosity $\eta^*$, real portion of viscosity $\eta'$, imaginary portion of viscosity $\eta''$, phase shift angle $\delta$, and loss factor $\tan(\delta)$.

Dynamic Tests

There are two basic test modes for oscillatory tests performed by the tool 100. The first involves controlled shear deformation. In this test, strain $\gamma(t)$ is introduced to the test fluid by inducing a twist angle (deflection) $\varphi(t)$ at a point along the shaft 120. The twist angle $\varphi(t)$ is represented by the following equation:

$$\varphi(t) = \varphi_A \cos(\omega t) \quad (8)$$

where $\varphi_A$ is amplitude. The torque $M(t)$ required to induce the twist angle and the resulting phase shift angle $\delta$ are measured. Torque $M(t)$ is represented by the following equation:

$$M(t) = M_A \cos(\omega t + \delta). \quad (9)$$

The torque $M(t)$ is proportional to the sheer stress $\tau(t)$, and the complex shear modulus $G^*$ may be calculated using Eq. (4).

The second test involves controlled shear stress. In this test, shear stress $\tau(t)$ is introduced to the test fluid by applying torque $M(t)$ to a point along the shaft 120 and measuring the resulting twist angle and phase shift. The complex shear modulus $G^*$ is then calculated using Eq. (4).

FIG. 2A shows an illustrative rotational rheometry test configuration 200. In test configuration 200, sensor 118A is positioned above and/or sensor 118B is positioned to the side of a light path surface 202 coupled to or integrated with shaft 120. As the shaft 120 undergoes twisting due to shearing of test fluid 204 between sleeve 124 and bob 122, the light path surface 202 is radially or axially displaced. For both axial and radial displacement as a function of shaft twist angle, the light path surface 202 may correspond to a flat angled surface, a curved surface, or a stepped surface to provide a linear or quantized correlation between twist angle and light path surface displacement. For radial displacement, an eccentrically mounted disc is another option for light path surface 202. It should be appreciated that the light path surface 202 may correspond to a solid object coupled to or integrated with shaft 120, a hollow object coupled to or integrated with shaft 120, a thin strip of material coupled to or integrated with shaft 120, or a customized surface that is part of shaft 120. Any shape may be used for the light path surface 202 as long as it is radially or axially displaced as the shape rotates concurrently with a point along the shaft 120). Further, it should be appreciated that a plurality of sensors 118A and/or a plurality of sensors 118B could be used to measure axial displacement and/or radial displacement at different measurement points of a light path surface 202.

FIGS. 2B and 2C show illustrative optical shaft twist angle measurement options. In FIG. 2B, light path surface 202 is external to the shaft 120. When twisting of the shaft 120 occurs at the point where the light path surface 202 is positioned, the light path surface 202 turns resulting in an axial displacement 210A and/or a radial displacement 210B of the light path surface 202. For example, the point at which the axial displacement 210A arrow contacts the light path surface 202 may correspond to a measurement point for sensor 118A. Meanwhile, the point at which the radial displacement 210B arrow contacts the light path surface 202 may correspond to a measurement point for sensor 118B.

In FIG. 2C, the light path surface 202 is internal to the shaft 120. When twisting of the shaft 120 occurs at the point where the light path surface 202 is positioned, the light path surface 202 turns resulting in axial displacement 210A of the light path surface 202. For example, the point at which the axial displacement 210A arrow contacts the light path surface 202 may correspond to a measurement point for sensor 118A. In at least some embodiments, the sensors 118A and 118B correspond to spectral-interference laser displacement meters (e.g., Keyence SI-F series) that measure a light path length that varies in accordance with axial displacement 210A or radial displacement 210B of a measurement point for light path interface 202.

FIGS. 3A-3F shows alternative rotational rheometry test configurations. For the test configuration of FIG. 3A, a cylindrical bob 122A coupled to shaft 120 is immersed in test fluid 204 within sleeve 124 (similar to FIG. 2A). For the test configuration of FIG. 3B, a conical bob 122B coupled to shaft 120 is partially immersed in test fluid 204 within sleeve 124. For the test configuration of FIG. 3C, a disc bob 122C coupled to shaft 120 is contacts the test fluid 204 within sleeve 124. For the test configuration of FIG. 3D, a bob 122D corresponds to a hollow cylinder that is open at one end. As shown, the bob 122D is partially immersed in a test fluid 204 between sleeve 124 and inner member 304. The inner member 304 may correspond to an inner cylinder that is placed in the sleeve 124 or that is part of sleeve 124. Note: in the test configuration of FIG. 3D, inner and outer surfaces of the bob 122D contact the fluid 204. For the test configuration of FIG. 3E, bob 122E has a cylindrical shape with a conical shape at one end. The bob 122E is immersed in test fluid 204 within sleeve 124. For the test configuration of FIG. 3F, bob 122F is immersed in test fluid 204 within sleeve 124. The bob 122F is shaped such that air 306 is trapped by the bob 122F.

The test configurations of FIGS. 3A-3F are only examples. Other bob and sleeve configurations are possible. In the test configurations of FIGS. 3A-3F, rotation of the sleeve 124 causes twisting of the shaft 120, which may be measured as described herein. In alternative test scenarios, the shaft 120 and bob 122 rotate within sleeve 124 or a fluid container 126. The rotation of the bob 124 and shaft 122 in a test fluid causes twisting of the shaft 120, which may be measured as described herein. The amount of shaft twisting that occurs may be monitored and correlated to a torque value and/or test fluid parameter.

FIG. 4 shows an illustrative chart 400 that correlates a rotation speed with twist angle at a point along a shaft. In chart 400, a default angle for a point along a shaft may be identified when there is no rotation of rotor 124 or bob 122. Further, a twist angle corresponding to one or more rotation per minute (RPM) settings may be used to determine a line slope. As shown, RPM settings $S_1$ and $S_2$ correspond respectively to different twist (deflection) angles ($\theta_{D1}$ and $\theta_{D2}$). In at least some embodiments, the slope of the line 402 in chart 400 can be correlated to torque values and/or test fluid parameters.

Figure 5B:
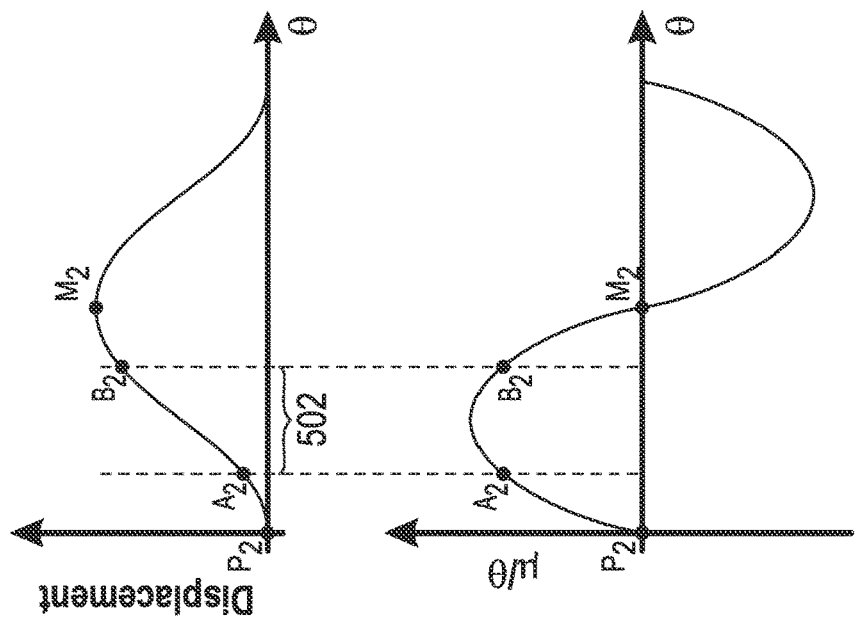
FIG. 5B is a set of graphs related to the light path surface of if FIG. 5A.
Figure 5A:
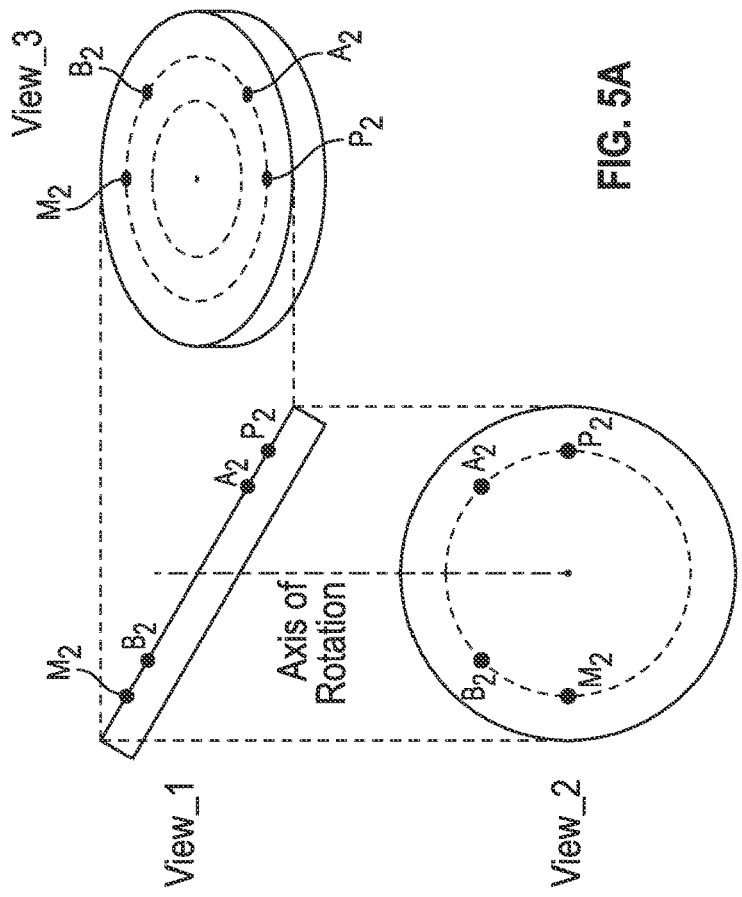
FIG. 5A is a multi-angle view of an example light path surface.

FIGS. 5A-5D show illustrative light path surface views and charts. In FIG. 5A, view_1 shows a side view of a light path surface (e.g., surface 202) corresponding to a disc, view_2 shows an overhead view of the disc, and view_3 shows a perspective view of the disc. Various points ($P_2$, $A_2$, $B_2$, and $M_2$) are labeled on the disc, and correspond to points along a path that is traced as the disc rotates about the axis of rotation. At a given time, $P_2$ corresponds to a lowest and rightmost point along the path, while $M_2$ corresponds to a highest and leftmost point along the path. If the disc is rotated 180 degrees from the position shown, the positions of $P_2$ and $M_2$ will be reversed ($P_2$ will be at the highest and leftmost point along the path, and $M_2$ will be at the lowest and rightmost point along the path).

FIG. 5B shows the effect of rotating the disc. More specifically, FIG. 5B shows a top chart representing axial displacement as a function of rotation angle for the disc, and a bottom chart representing axial displacement/degree (e.g., microns/degree) as a function of rotation angle for the disc (i.e., the bottom chart is the derivative of the top chart). In FIG. 5B, the axial displacement as a function of rotation angle corresponds to a cosine wave, while the axial displacement/degree as a function of rotation angle corresponds to a sine wave. Other mathematical relationships between axial displacement and rotation angle are possible if a curved or stepped surface is used with the disc.

In at least some embodiments, only a small amount of twist angle occurs (e.g., 10 degrees or less). In such case, the path portion between points $A_2$ and $B_2$ is preferable for light path length measurements as the axial displacement/degree as a function of rotation angle is highest in this path portion (see the bottom chart of FIG. 5B). This path portion corresponds to a rotation angle range 502 in FIG. 5B that includes a 90 degree rotation offset from either $P_2$ or $M_2$ (where axial displacement/degree is highest). For very small deflections, a measurement point around this 90 degree offset from either $P_2$ or $M_2$ provides the most sensitivity. Path portions with lower axial displacement/degree as a function of rotation angle are usable, but the accuracy suffers and axial displacement ambiguity as a function of rotation angle can occur (e.g., the axial displacement values at angles before and after $M_2$ are the same). Such ambiguities could be resolved if measurements are accurately tracked over time, or if multiple light path surfaces with different orientations are used. Preferably, the path portion to be used for the disc is carefully selected to facilitate obtaining accurate shaft twist angle measurements even if the twist angle range is small.

As an example, to use the path portion between points $A_2$ and $B_2$, a sensor and light path oriented above point $A_2$ (assuming counterclockwise rotation) would be suitable. For clockwise rotation, a sensor and light path oriented above point $B_2$ would be suitable. It should be appreciated that the points along the path that are 180 degrees from points $A_2$ and $B_2$ could alternatively be used with similar results. Further, it should be appreciated that the disc is just one example of a light path surface.

Figure 5D:
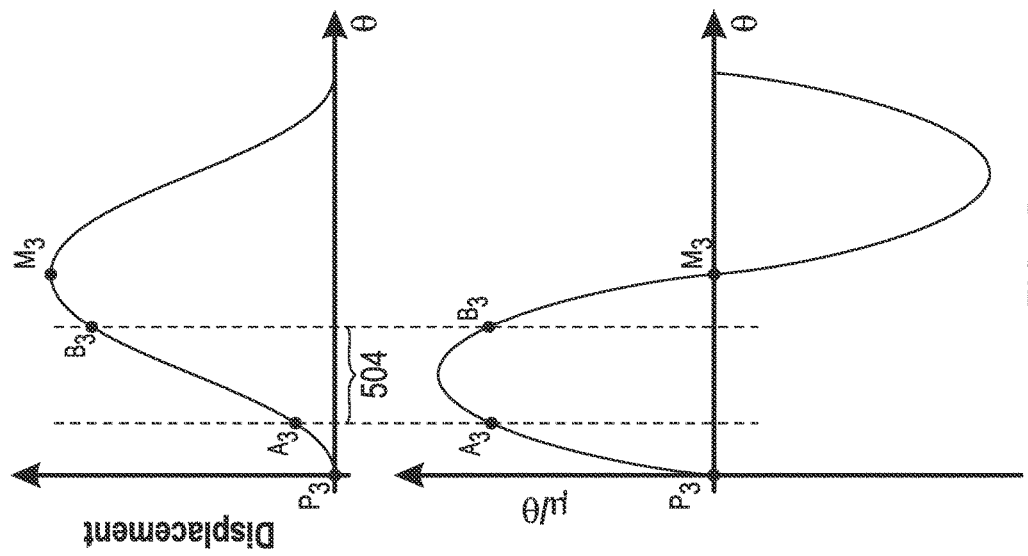
FIG. 5D is a set of graphs related to the light path surface of FIG. 5C.
Figure 5C:
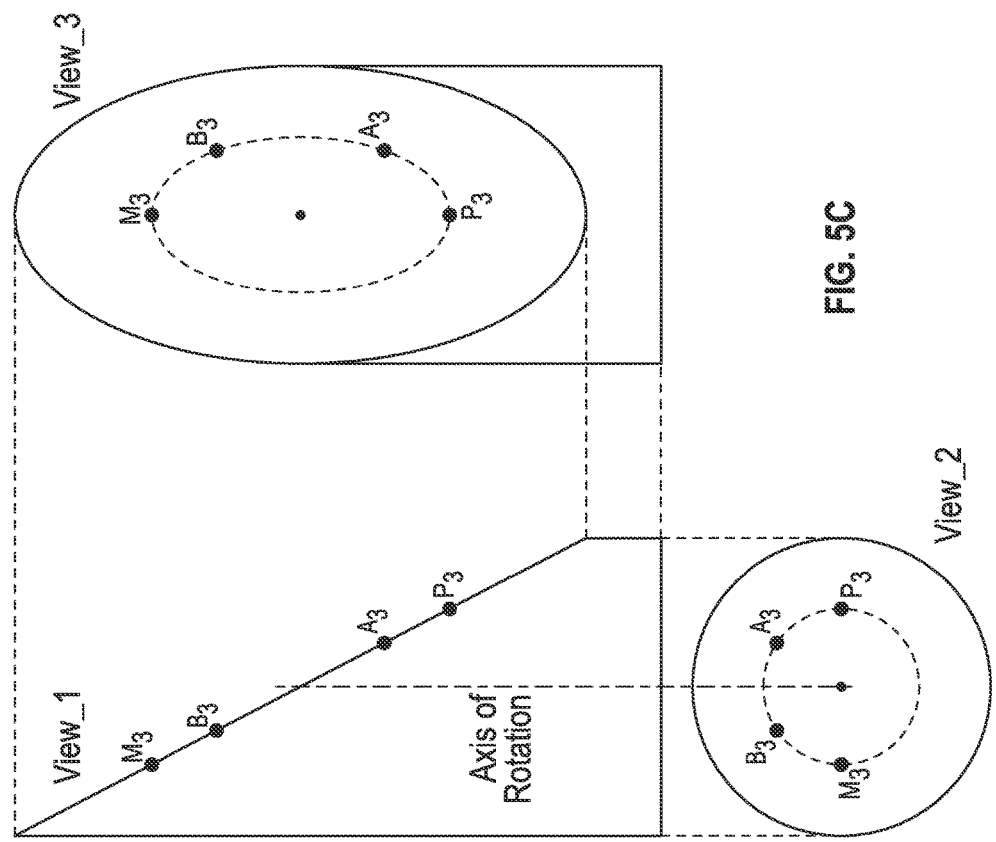
FIG. 5C is a multi-angle view of another example light path surface.

FIG. 5C show an alternative light path surface, corresponding to a partial cylinder with an angled surface. In FIG. 5C, view_1 shows a side view of the partial cylinder, view_2 shows an overhead view of the partial cylinder, and view_3 shows a perspective view of the partial cylinder. Various points ($P_3$, $A_3$, $B_3$, and $M_3$) are labeled on the partial cylinder, and correspond to points along a path that is traced as the partial cylinder rotates about the axis of rotation. At a given time, $P_3$ corresponds to a lowest and rightmost point along the path, while $M_3$ corresponds to a highest and leftmost point along the path. If the disc is rotated 180 degrees from the position shown, the positions of $P_3$ and $M_3$ will be reversed ($P_3$ will be at the highest and leftmost point along the path, and $M_3$ will be at the lowest and rightmost point along the path).

FIG. 5D shows the effect of rotating the partial cylinder. More specifically, FIG. 5D shows a top chart representing axial displacement as a function of rotation angle for the partial cylinder, and a bottom chart representing axial displacement/degree (e.g., microns/degree) as a function of rotation angle for the partial cylinder (i.e., the bottom chart is the derivative of the top chart). In FIG. 5D, the axial displacement as a function of rotation angle corresponds to a cosine wave, while the axial displacement/degree as a function of rotation angle corresponds to a sine wave. Other mathematical relationships between axial displacement and rotation angle are possible if a curved or stepped surface is used with the partial cylinder.

In at least some embodiments, only a small amount of twist angle occurs (e.g., 10 degrees or less). In such case, the path portion between points $A_3$ and $B_3$ is preferable for light path length measurements as the displacement/degree as a function of angle is highest in this path portion (see the bottom chart of FIG. 5D). This path portion corresponds to a rotation angle range 504 in FIG. 5D that includes a 90 degree rotation offset from either $P_3$ or $M_3$ (where axial displacement/degree is highest). For very small deflections, a measurement point around this 90 degree offset from either $P_2$ or $M_2$ provides the most sensitivity. Path portions with lower displacement/degree as a function of angle are usable, but the accuracy suffers and displacement ambiguity as a function of angle can occur (the displacement values at angles before and after $M_3$ are the same). Such ambiguities could be resolved if measurements are accurately tracked over time, or if multiple light path surfaces with different orientations are used. Preferably, the path portion to be used for the partial cylinder is carefully selected to facilitate obtaining accurate shaft twist angle measurements even if the twist angle range is small.

As an example, to use the path portion between points $A_3$ and $B_3$, a sensor and light path oriented above point $A_3$ (assuming counterclockwise rotation) would be suitable. For clockwise rotation, a sensor and light path oriented above point $B_3$ would be suitable. It should be appreciated that the points along the path that are 180 degrees from points $A_3$ and $B_3$ could alternatively be used with similar results. Further, it should be appreciated that the partial cylinder is just one example of a light path surface.

Compared to the disc related to FIGS. 5A and 5B, the partial cylinder related to FIGS. 5C and 5D causes more axial displacement. This is due to the inclination angle for the angled surface of the partial cylinder being greater (steeper) than the inclination angle for the angled surface of the disc. Accordingly, rotation of the partial cylinder results in more axial displacement and more axial displacement/ degree compared to rotation of the disc. In contrast, rotation of the partial cylinder results in less radial displacement and less radial displacement/degree compared to rotation of the disc.

It should be noted that the amount of displacement and displacement/degree for the disc and the partial cylinder would decrease compared to the charts shown for FIGS. 5B and 5D if the paths traced were closer to each rotation of axis (i.e., if the radius shown in view_2 of FIGS. 5A and 5C were smaller). Alternatively, if the paths traced for the disc and the partial cylinder were further from each rotation of axis (i.e., if the radius shown in view_2 of FIGS. 5A and 5C were larger), the amount of displacement and displacement/degree would increase compared to the charts shown for FIGS. 5B and 5D.

Figure 6B:
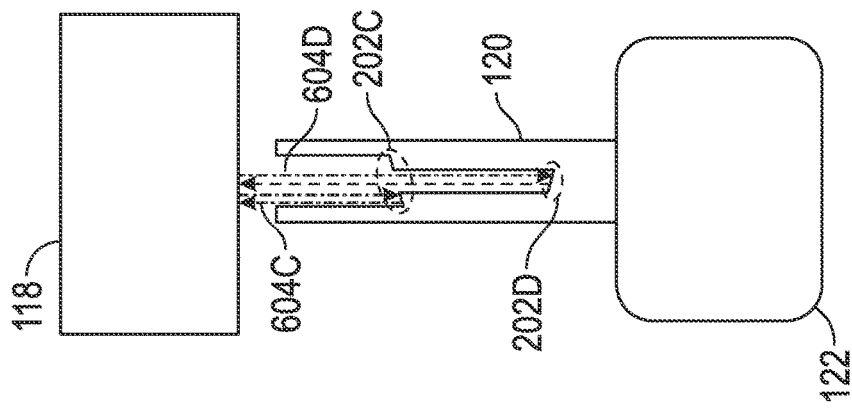
FIG. 6B is a cross-sectional view of another multi-point optical shaft twist angle measurement configuration.
Figure 6A:
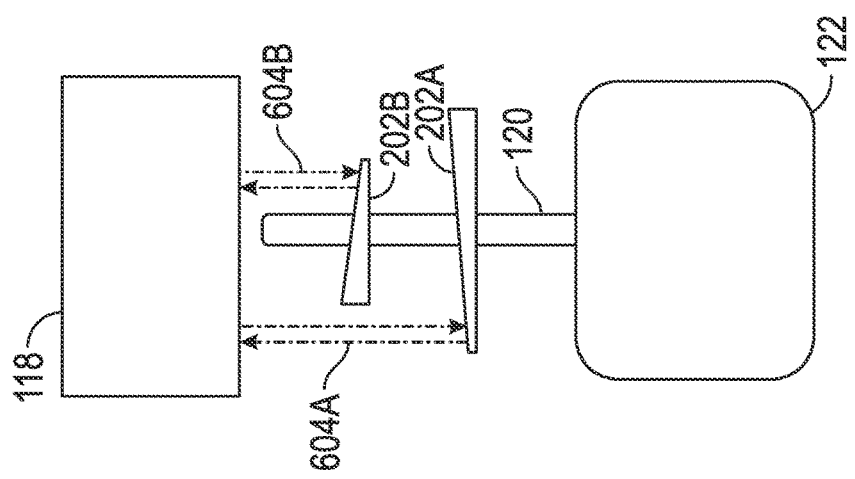
FIG. 6A is a side view of a multi-point optical shaft twist angle measurement configuration.

FIGS. 6A and 6B show illustrative multi-point optical shaft twist angle measurement configurations. In FIG. 6A, external light path surfaces 202A and 202B are positioned at different points along the shaft 120 between sensors 118 and bob 122. As an example, each of the external light path surfaces 202A and 202B may correspond to a disc or partial cylinder with an inclined reflective surface (see e.g., FIG. 5A or 5C). In FIG. 6A, the external light path surface 202A is larger than the external light path surface 202B so that sensors 118 have a line of sight to both of the external light path surfaces 202A and 202B. In accordance with at least some embodiments, the sensors 118 in FIG. 6A correspond to laser displacement meters and the external light path surface 202A and 202B cause a light path length to vary as a function of twist angle at a point along the shaft 120. More specifically, the external light path surface 202A causes the length of light path 604A to vary as a function of twist angle at the point along the shaft 120 where the external light path surface 202A is positioned. Meanwhile, the external light path surface 202B causes the length of light path 604B to vary as a function of twist angle at the point along the shaft 120 where the external light path surface 202B is positioned.

In FIG. 6B, internal light path surfaces 202C and 202D are positioned at different points along the shaft 120 between sensors 118 and bob 122. Each of the internal light path surfaces 202C and 202D may correspond to an inclined reflective surface that is part of the shaft 120 or that is added to the shaft 120. The internal light path surface 202C has a hole so that sensors 118 have a line of sight to both of the internal light path surfaces 202C and 202D (i.e., the internal light path surfaces 202C and 202D have a concentric arrangement). In alternative embodiments, the internal light path surfaces 202C and 202D are not concentric, each having their own measurement "tunnel" inside shaft 120. (This configuration would work as long as the amount of twisting does not exceed a corresponding measurement range). In accordance with at least some embodiments, the sensors 118 in FIG. 6B correspond to laser displacement meters and the internal light path surfaces 202C and 202D cause a light path length to vary as a function of twist angle at a point along the shaft 120. More specifically, the internal light path surface 202C causes the length of light path 604C to vary as a function of twist angle at the point along the shaft 120 where the internal light path surfaces 202C is positioned. Meanwhile, the internal light path surface 202D causes the length of light path 604D to vary as a function of twist angle at the point along the shaft 120 where the internal light path surface 202D is positioned.

Although the light paths 604A-604D shown in FIGS. 6A and 6B are shown with straight lines, it should be appreciated that such lights paths may vary. As an example, a light path may vary depending on the angle of reflection that occurs at the light path surfaces 202A-202D. Further, a light path may vary to facilitate integrating the sensors 118 with a tool (e.g., tool 100) or tool housing (e.g., one or more mirrors may be used to change a light path regardless of the particular orientation of a sensor 118). In some embodiments, the inside of shaft 120 may be polished or otherwise have a reflective surface to guide the light corresponding to light paths 604C and 604D. Further, reflective light path components external to the shaft 120 may be used for the external light path surfaces 202A and 202B to guide the light corresponding to lights paths 604A and 604B. Regardless of the particular light path arrangement used, the light path length will vary depending on the amount of twisting at the point along the shaft 120 where the light path surfaces 202A-202D are positioned. It should be appreciated that an uneven amount of twisting may occur along the shaft 120, and thus multi-point optical shaft twist angle measurements (e.g., relative twist angle measurements) rather than single-point twist angle measurements may be used to determine a torque value and/or test fluid parameters values.

Figure 7:
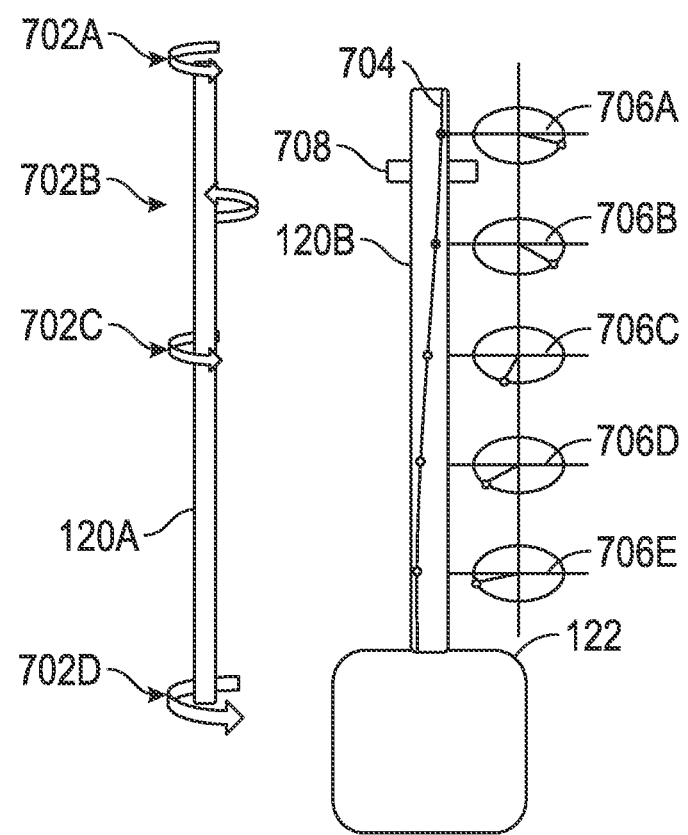
FIG. 7 is a set of side views of a shaft showing twisting at different points along the shaft.

FIG. 7 shows illustrative twisting at different points 702A-702D along a shaft 120A. The amount of twisting at the different points 702A-702D vary depending on the material used for the shaft 120A, the total length of the shaft 120A, and the torque applied at different points along the shaft 120A.

For shaft 120B, line 704 and angle charts 706A-706E represent the amount of twisting that occurs at different points along the shaft 120B in response to a test. As shown, the amount of twisting may be greatest near bob 122. Further, FIG. 7 shows a seal 708 positioned along the shaft 120B. The seal 708 may part of an interface that enables temperature and/or pressure to be maintained or adjusted during a test.

Figure 8C:
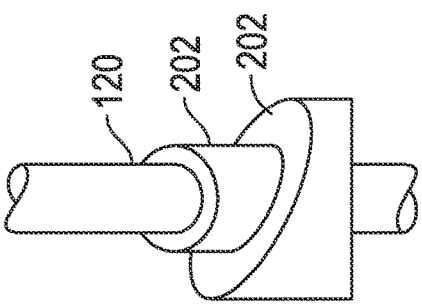
FIGS. 8A-8E are perspective views of shafts with light path surfaces.
Figure 8B:
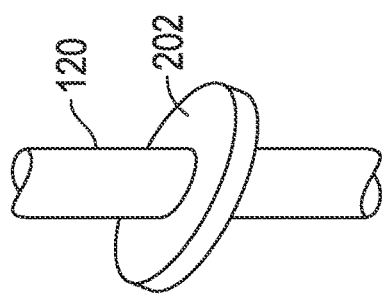
Figure 8A:
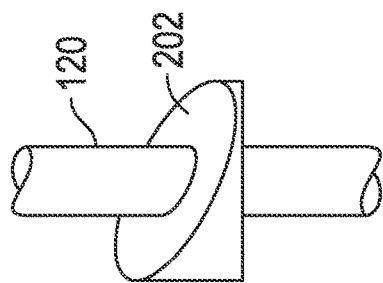
Figure 8E:
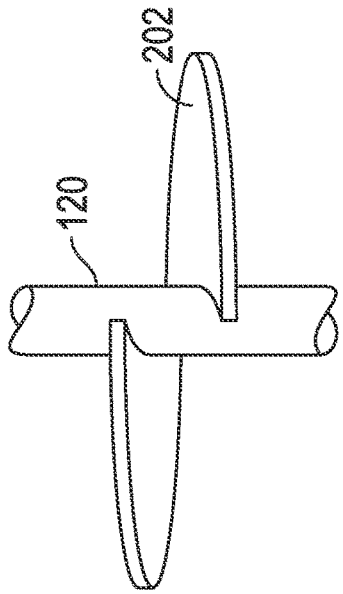
Figure 8D:
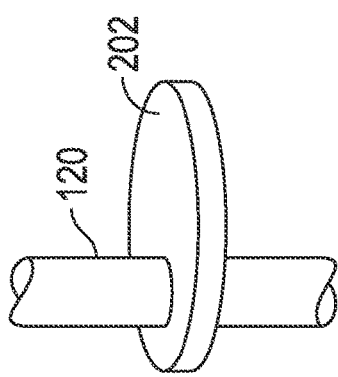

FIGS. 8A-8E show illustrative three-dimensional views of shafts 120 with light path surfaces 202. In FIG. 8A, a shaft 120 with a light path surface 202 in the shape of a partial cylinder is represented. In FIG. 8B, a shaft 120 with a light path surface 202 in the shape of an inclined disc is represented. In FIG. 8C, a shaft 120 with multiple light path surfaces 202 in the shape concentric partial cylinders at different orientations is represented. In FIG. 8D, a shaft 120 with a light path surface 202 in the shape of an eccentric disc is represented. In FIG. 8E, a shaft 120 with a light path surface 202 in the shape of a three-dimensional helical surface is represented.

The configurations of FIGS. 8A, 8B, 8C, and 8E are operable with overhead sensors (sensor 118A in FIGS. 2A and 2B) to track axial displacement as a function of twist angle along shaft 120, while the configuration of FIG. 8D is operable with a side sensor (sensor 118B in FIGS. 2A and 2B) to track radial displacement as a function of twist angle along shaft 120. Further, it should be appreciated that the configurations of FIGS. 8A, 8B, and 8C are operable with side sensors (sensor 118B in FIGS. 2A and 2B) to track radial displacement as a function of twist angle along shaft 120. Further, while the configurations of FIGS. 8A, 8B, 8C, and 8E show light path surfaces 202 that are external to the shaft 120, similar configurations could be employed internal to the shaft 120. Further, it should be noted that use of multiple sensors 118 and multiple light path surfaces 202 at different orientations can improve accuracy and overcome ambiguities. Further, it is possible to track both radial and axial displacement as a function of twist angle along shaft 120. Further, while the configurations of FIGS. 8A-8E are shown to use light path surfaces 202 corresponding to solid objects, it should be appreciated that hollow objects and/or thin surfaces would also reflect light and may be used.

Figure 9:
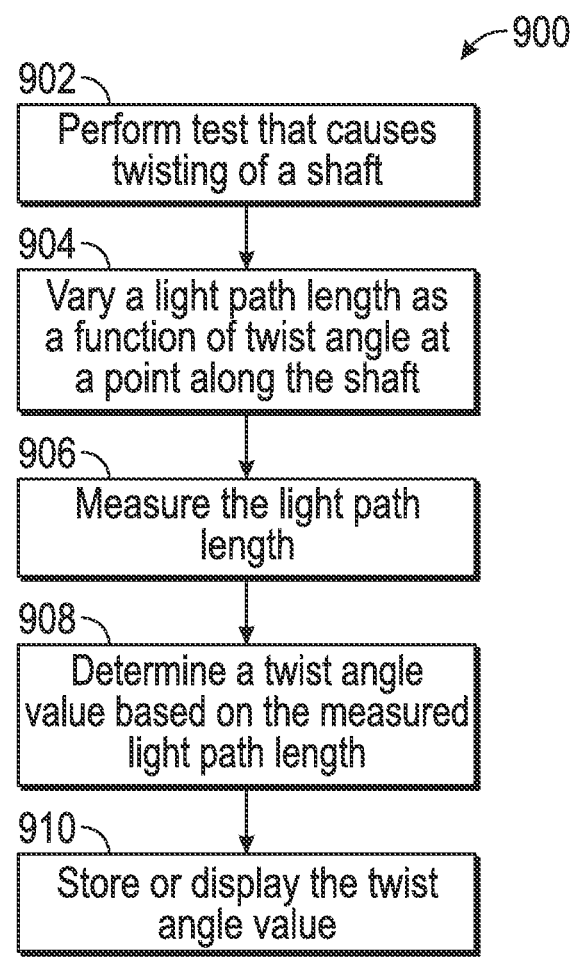
FIG. 9 is a flowchart of an optical shaft twist angle measurement method.

FIG. 9 shows an illustrative flowchart of an optical shaft twist angle measurement method 900. As shown, the method 900 comprises performing a test that causes twisting of a shaft (e.g., shaft 120) (block 902). As an example, a rotational rheometer test may be performed at block 902. At block 904, a light path length (e.g., light paths 604A-604D) is varied as a function of twist angle at a point along the shaft. The light path length is measured at block 906, and a twist angle value is determined based on the measured light path length at block 908. At block 910, the twist angle value is stored or displayed (e.g., via tool display 114 or a computer in communication with tool 100). Additionally or alternatively, a torque value and/or test fluid parameter related to the twist angle may be stored or displayed. In at least some embodiments, multiple light path surfaces may be integrated externally or internally with a shaft. Using multiple light path surfaces enables multi-point or relative twist angle values to be determined by comparing the twist angle values at different points along the shaft. As an example, multi-point or relative twist angle values may provide an improved correlation between twisting of a shaft due to the interaction of a test fluid with a bob 122 attached to the shaft. This is especially helpful if one or more points along the shaft contact a seal or other source of friction.

Embodiments disclosed herein include:

A: A system that comprises a shaft and a light path surface coupled to or integrated with the shaft. The light path surface is displaced as a function of twist angle at a point along the shaft. The system also comprises a sensor configured to measure the light path length that varies according to displacement of the light path surface. The system also comprises a processing unit that determines a twist angle value for the point along the shaft based on the measured light path length.

B: A method that comprises performing a test that causes twisting of a shaft, and varying a light path length as a function of twist angle at a point along the shaft. The method also comprises measuring the light path length, and determining a twist angle value based on the measured light path length. The method also comprises storing or displaying the twist angle value or a parameter derived from the twist angle value.

Each of the embodiments, A and B, may have one or more of the following additional elements in any combination. Element 1: further comprising a bob coupled to the shaft, and a sleeve or fluid container configured to enclose the bob and a test fluid. The twist angle at the point along the shaft is due to interaction of the bob with the test fluid. Element 2: further comprising a motor configured to turn the shaft or the sleeve. Element 3: further comprising at least one memory unit and sensors to measure temperature and pressure of the fluid. The twist angle value value, the measured temperature of the fluid, and the measured pressure of the fluid are stored in the at least one memory unit, and are used to calculate a test fluid parameter. Element 4: further comprising an interface for adjusting temperature and pressure of the test fluid. Element 5: further comprising at least one memory unit and sensors to measure temperature and pressure of the test fluid. The processor determines twist angle values corresponding to different temperatures or pressures for the test fluid. The twist angle values are stored in the at least one memory unit and are used to calculate a test fluid parameter. Element 6: the light path surface is external to the shaft, wherein the light path length varies due to radial displacement of the light path surface as a function of twist angle at the point along the shaft. Element 7: the light path surface is external to the shaft, wherein the light path length varies due to axial displacement of the light path surface as a function of twist angle at the point along the shaft. Element 8: the light path surface is internal to the shaft, wherein the light path length varies due to axial displacement of the light path surface as a function of twist angle at the point along the shaft. Element 9: further comprising one or more additional light path surfaces coupled to or integrated with the shaft at different points along the shaft to enable the processor to determine multiple twist angle values corresponding to the different points along the shaft. Element 10: the processor determines a relative twist angle value by comparing twist angle values corresponding to different points along the shaft, and wherein the processor uses the relative twist angle value to determine a test result.

Element 11: performing the test comprises putting a bob coupled to the shaft in contact with a test fluid. Element 12: further comprising rotating the shaft or a sleeve that holds the test fluid. Element 13: further comprising measuring temperature and pressure of the fluid, wherein the twist angle value, the measured temperature of the fluid, and the measured pressure of the fluid are stored and used to calculate a test fluid parameter. Element 14: further comprising adjusting temperature or pressure of the fluid, and determining twist angle values corresponding to different temperatures or pressures for the fluid, wherein the twist angle values are used to calculate a test fluid parameter. Element 15: varying the light path length comprises radially displacing a light path surface external to the shaft as a function of twist angle at the point along the shaft. Element 16: wherein varying the light path length comprises axially displacing a light path surface external to the shaft as a function of twist angle at the point along the shaft. Element 17: varying the light path length comprises axially displacing a light path surface internal to the shaft as a function of twist angle at the point along the shaft. Element 18: further comprising varying different light path lengths at different points along the shaft to enable determination of a relative twist angle value that compares twist angles at different points along the shaft, and using the relative twist angle value to determine a test result.

Numerous variations and modifications will become apparent to those skilled in the art once the above disclosure is fully appreciated. For example, depending on the test fluid, the light path surface may be separated from the test fluid as shown herein, or immersed in the test fluid. It is intended that the following claims be interpreted to embrace all such variations and modifications.

What is claimed is:

1. A system that comprises:
    a shaft in contact with a pressure seal, the pressure seal, when the shaft twists due to a torque, creates a friction force that opposes the torque of the shaft;
    a plurality of light path surfaces coupled to or integrated with the shaft, each of the plurality of light path surfaces are located at different points axially along the shaft, wherein the light path surfaces are displaced as a function of twist angle at each of the different points along the shaft when the shaft is subject to the torque and the friction force;
    one or more sensors configured to measure a light path length that varies according to displacement of each of the plurality of light path surfaces;

a processing unit that determines a twist angle value for each of the different points along the shaft based on the measured light path lengths of each of the plurality of light path surfaces, the processing unit determines the torque, compensating for the friction force caused by the seal, based on the twist angle value for each of the different points.

2. The system of claim 1, further comprising:
a bob coupled to the shaft; and
a sleeve or fluid container configured to enclose the bob and a test fluid, wherein the twist angle at each of the points along the shaft is due to interaction of the bob with the test fluid.

3. The system of claim 2, further comprising a motor configured to turn the shaft or the sleeve.

4. The system of claim 2, further comprising:
at least one memory unit; and
sensors to measure temperature and pressure of the test fluid,
wherein the twist angle value, the measured temperature of the test fluid, and the measured pressure of the test fluid are stored in the at least one memory unit, and are used to calculate a test fluid parameter.

5. The system of claim 2, further comprising an interface for adjusting temperature and pressure of the test fluid.

6. The system of claim 5, further comprising:
at least one memory unit; and
sensors to measure temperature and pressure of the test fluid,
wherein the processing unit determines twist angle values corresponding to different temperatures or pressures for the test fluid,
wherein the twist angle values are stored in the at least one memory unit and are used to calculate a test fluid parameter.

7. The system of claim 1, wherein at least one of the plurality of light path surfaces is external to the shaft, and wherein the light path length varies due to radial displacement of the light path surface as a function of twist angle at the point along the shaft.

8. The system of claim 1, wherein at least one of the plurality of light path surfaces is external to the shaft, and wherein the light path length varies due to axial displacement of the light path surface as a function of twist angle at the point along the shaft.

9. The system of claim 1, wherein at least one of the plurality of light path surfaces is internal to the shaft, wherein the light path length varies due to axial displacement of the light path surface as a function of twist angle at the point along the shaft.

10. The system of claim 1, further comprising one or more additional light path surfaces coupled to or integrated with the shaft at different points along the shaft to enable the processing unit to determine multiple twist angle values corresponding to the different points along the shaft.

11. The system of claim 1, wherein the processor determines a relative twist angle value by comparing the twist angle values corresponding to the different points along the shaft, and wherein the processing unit uses the relative twist angle value to determine a test result.

12. A method that comprises:
performing a test that includes a torque which causes twisting of a shaft, the shaft being in contact with a pressure seal which creates a friction force that opposes the torque of the shaft;
varying a plurality of light path lengths as a function of twist angle at different points axially along the shaft;
measuring the light path lengths;
determining a twist angle value based on the measured light path lengths;
determining the torque, compensating for the friction force caused by the pressure seal, based on the twist angle value for each of the different points; and
storing or displaying the twist angle value or a parameter derived from the twist angle value.

13. The method of claim 12, wherein performing the test comprises putting a bob coupled to the shaft in contact with a test fluid.

14. The method of claim 13, further comprising rotating the shaft or a sleeve that holds the test fluid.

15. The method of claim 13, further comprising measuring temperature and pressure of the fluid, wherein the twist angle value, the measured temperature of the fluid, and the measured pressure of the fluid are stored and used to calculate a test fluid parameter.

16. The method of claim 13, further comprising adjusting temperature or pressure of the fluid, and determining twist angle values corresponding to different temperatures or pressures for the fluid, wherein the twist angle values are used to calculate a test fluid parameter.

17. The method of claim 12, wherein varying the light path length comprises radially displacing a light path surface external to the shaft as a function of twist angle at the point along the shaft.

18. The method of claim 12, wherein varying the light path length comprises axially displacing a light path surface external to the shaft as a function of twist angle at the point along the shaft.

19. The method of claim 12, wherein varying the light path length comprises axially displacing a light path surface internal to the shaft as a function of twist angle at the point along the shaft.

20. The method of claim 12, further comprising:
varying different light path lengths at different points along the shaft to enable determination of a relative twist angle value that compares twist angles at different points along the shaft; and
using the relative twist angle value to determine a test result.

* * * * *